United States Patent

Shire et al.

[11] 3,796,446
[45] Mar. 12, 1974

[54] CONNECTOR

[75] Inventors: Harold Shire, Los Angeles; Fred Greenwald, Southgate, both of Calif.

[73] Assignee: General Connectors Corporation, Burbank, Calif.

[22] Filed: Dec. 10, 1971

[21] Appl. No.: 206,964

Related U.S. Application Data

[62] Division of Ser. No. 42,244, June 1, 1970.

[52] U.S. Cl. ............... 285/110, 277/153, 285/231, 285/369
[51] Int. Cl. ............................................. F16l 17/02
[58] Field of Search ................... 277/152, 153, 181; 285/110, 111, 231, 369, 379

[56] References Cited
UNITED STATES PATENTS

| | | | |
|---|---|---|---|
| 2,850,299 | 9/1958 | Risley | 285/369 X |
| 3,432,189 | 3/1969 | Buller | 285/369 X |
| 2,538,683 | 1/1951 | Guiler et al. | 285/369 X |
| 2,771,311 | 11/1956 | Hottenroth | 285/369 X |
| 3,440,122 | 4/1969 | McCormick | 277/153 X |
| 3,572,732 | 3/1971 | Sekulich | 277/153 |
| 3,614,183 | 10/1971 | Berens et al. | 277/153 X |
| 3,698,727 | 10/1972 | Greenwald | 285/110 X |

*Primary Examiner*—Mervin Stein
*Assistant Examiner*—David H. Corbin

[57] ABSTRACT

The connecter comprises an open ended tube. Cup shaped closures are removably attached to the ends of the tube, a seal is mounted in each cup shaped closure. Both the seal and the cup shaped closure have aligned pipe receiving openings. These openings are designed to snugly receive the pipes to be connected. With this arrangement when pipes are inserted in the opening in a cup shaped closure and the associated seal, the outer surface of the pipe is in sealing engagement with the surface of the opening in the seal. Consequently the seals inside the cup shaped closures are isolated from the effects of temperature, moisture, and corrosive gasses outside the tube. Means may be provided for compressing the ends of the tube and the walls of the cup shaped closure so that the seal may be squeezed to sealingly engage the pipes should leakage occur.

6 Claims, 18 Drawing Figures

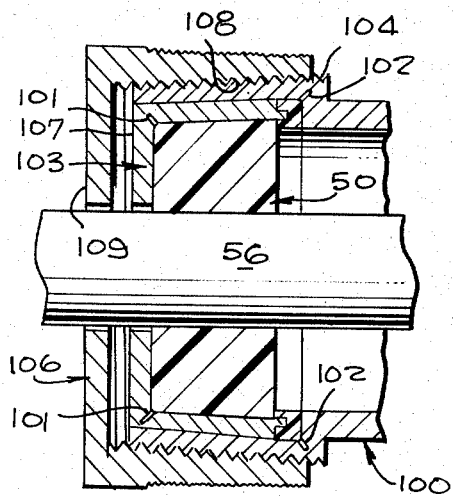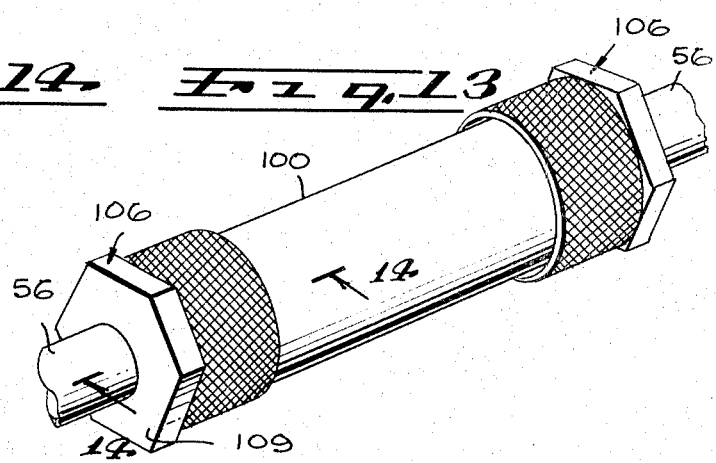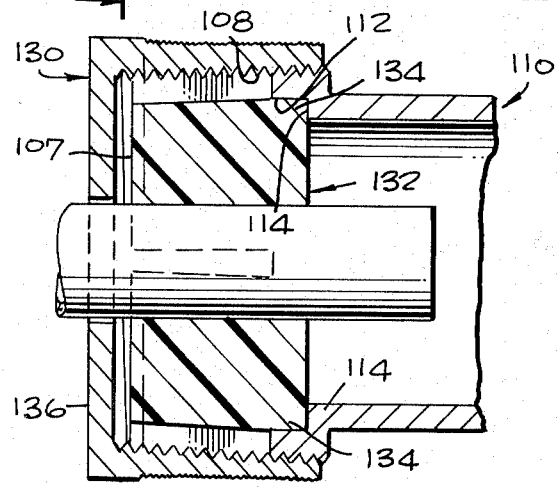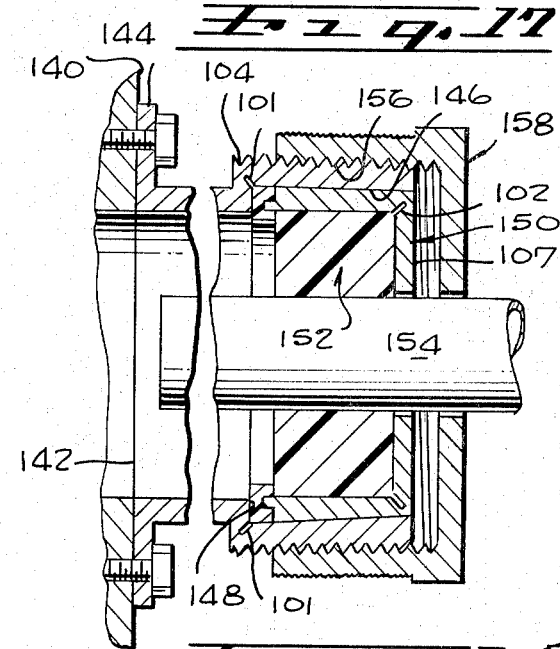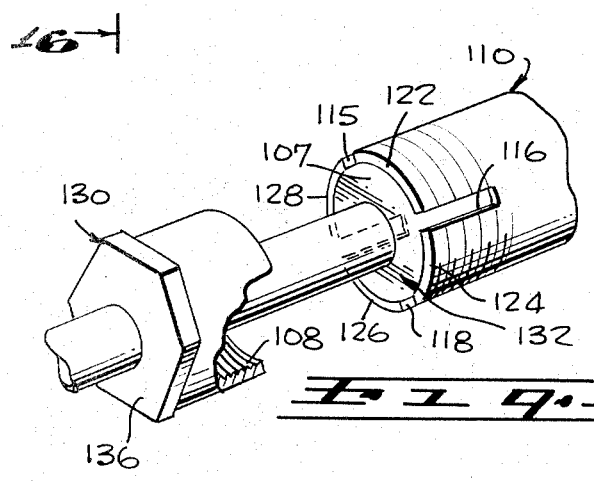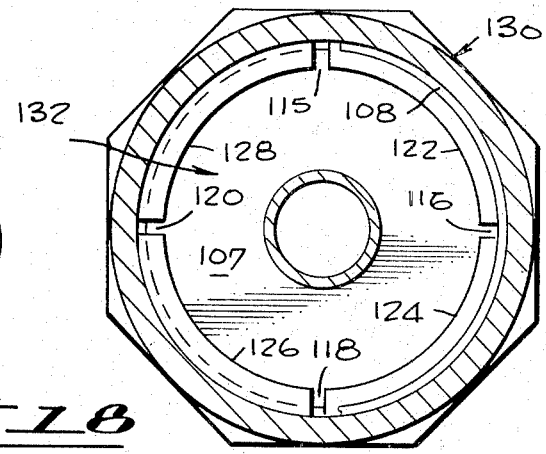

CONNECTOR

This is a division of application, Ser. No. 42244, filed June 1, 1970.

BRIEF SUMMARY AND BACKGROUND

Heretofore connecters for pipes of the kind designed to isolate the seal in the connecter from the environment external to the connecter was constructed from a cylindrical tube. The ends of the tube were provided with an inwardly projecting circular end wall. These end walls were provided with circular pipe receiving openings. The seal for such connecters was designed with a pipe receiving opening which was the size of the opening in the end wall. In order to insert the seal inside the connecter it was necessary to deform the seal and force it through the openings in the end walls. However, the deformation of the seal sometimes damaged it so it leaked or its useful life was shortened. Furthermore, the necessity of deforming the seal and squeezing it through the pipe receiving opening in the end wall restricted the choice of materials which could be used for the seal, because otherwise desirable materials when formed into a seal were too stiff to bend and force it through the opening in the end wall.

In this invention, the ends of the tube are open, and the end walls of the prior connecter are replaced here by cup shaped closures which are designed to be removably inserted in the ends of the tube. The cup shaped closures are designed to carry a seal and both the seal and the closure are provided with aligned pipe receiving openings. With this arrangement, the seal need not be deformed to be mounted in the connecter. In addition, the seal can be easily installed in the connecter by simply laying it in the removably mounted cup shaped closure. Furthermore, the choice of the seal is not limited and it can be composed of a wide variety of materials to satisfy particular environmental conditions.

What is needed therefore and comprises an important object of this invention is to provide a connecter having simple means for installing or replacing the connecter seals.

A further object of this invention is to provide a connecter with seals formed from any desired combination of materials.

Still another object of this invention is to provide a pipe connecter with a seal having means for continuously exerting a constrictive force on the portion of the seal engaging the pipe to shape the seal and prevent the layer of compression set material in the seal surrounding the pipe from leaking.

Yet a further object of this invention is to provide a connecter with means for varying the constrictive force on the portion of the seal engaging the pipe to stop leakage through the layer of compression set seal material surrounding the pipe.

These and other objects of this invention will become more apparent when better understood in the light of the drawing and the accompanying specification wherein:

FIG. 13 is a perspective view of a modified connecter having means thereon for squeezing the seal mounted in the ends of the connecter to stop leakage.

FIG. 14 is a sectional elevational view of an end of the connecter shown in FIG. 13.

FIG. 15 is an elevational sectional view of the end of a modified connecter seal having means thereon for squeezing the seal mounted in the ends of the connecter to stop leakage.

FIG. 16 is a sectional view taken on the line 16—16 of FIG. 15.

FIG. 17 is an elevational view of a modified connecter for attachment to a gas outlet in a bulkhead.

FIG. 18 is an exploded perspective view of the end portion of the connecter shown in FIG. 17.

Figure 1:
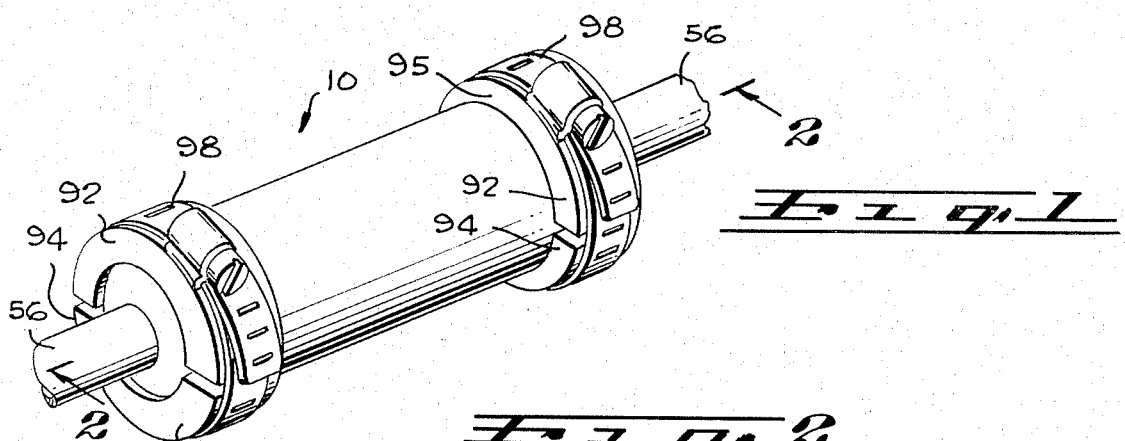
FIG. 1 is a perspective view of the connecter constructed according to the principles of this invention.

Referring now to FIG. 1 of the drawing, the connecter constructed according to the principles of this invention comprises, in this particular embodiment, a generally cylindrical tube indicated by the reference numeral 10. The tube is provided with open ends and the ends of the tube are counter bored at 12 and 14 to provide seal engaging shoulders 16 and 18 near the ends of the tube.

Figure 2:
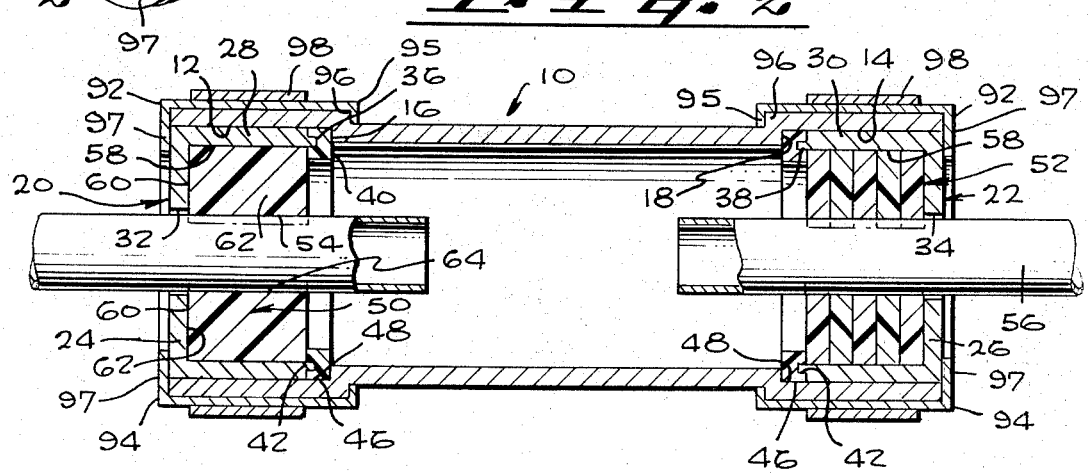
FIG. 2 is an elevational sectional view of the connecter shown in FIG. 1.

The open ends of tube 10 are provided with cup shaped closure portions 20 and 22. These cup shaped closure protions are circular in cross section and their external diameter is substantially equal to the internal diameter of the counter bored portions 12 and 14 of the connecter tube 10, as shown in FIG. 2. The cup shaped closures have base portions 24 and 26 respectively and cylindrical integrally attached cylindrical wall portions 28 and 30 respectively. The base, 24 and 26, of the cup shaped closures 20 and 22 are provided with pipe receiving openings 32 and 34 respectively. In addition, the free ends of the walls 28 and 30 are reduced in thickness at 36 and 38 for reasons to be described below.

A first annular seal 40 is provided. This seal is preferably constructed from a silicone rubber and is ring shaped. The seal is provided with a groove 42 at one end. This groove is designed to receive the reduced end portions 36 and 38 of the walls of the cup shaped closure, as shown in FIG. 2 of the drawing. The opposite end 44 is designed to bear against the shoulders 16 and 18 of the connecter housing in sealing engagement therewith. The outer or wall engaging side portion 46 of the seal 40 is designed to engage the inner surface 48 of the connecter tube 10, see FIG. 2.

A second pressure responsive seal 50 is mounted in the cup shaped closure portion 20 and in this particular embodiment, for purposes of illustration, a composite laminated seal 52 is mounted in the cup shaped closure portion 22. Seal 50, in this particular embodiment, is a cylindrical comparatively massive piece formed from a fiber glass impregnated silicone rubber. The seal 50 is provided with a pipe receiving bore 54 extending therethrough. As shown in the drawing, the seal is mounted in the cup shaped closure 20 so the bore 54 in seal 50 is aligned with the opening 32 in the base 24 of the closure 20. As seen in the drawings, the opening 32 and bore 54 are equal in size and are designed to receive a pipe 56. The external diameter of seal 50 is equal to the internal diameter of the inner surface 58 of the wall 28 of the closure 20 to provide a snug fit when the seal 50 is mounted inside the cup shaped closure 20.

Figure 3:
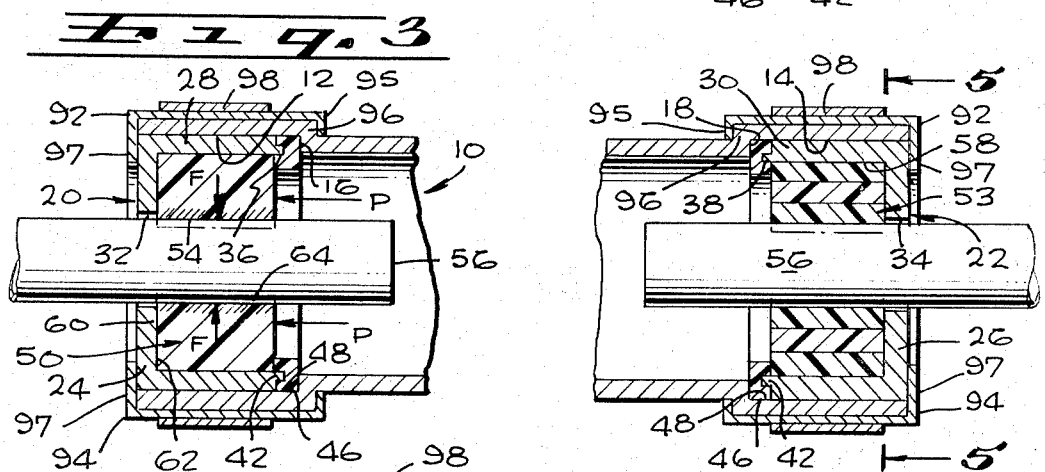
FIG. 3 is an elevational sectional view of the end portion of the connecter shown in FIG. 2 showing the effects of force and pressure on the seal.

When the interior of the connector 10 is pressurized, as from the flow of hot gases or fluids, the pressure causes the base 60 of the seal 50 to bear against the inner surface 62 of the base 24 of the cup shaped closure 20, see FIG. 3. This pressure also causes radially inwardly directed force F to be directed against the external surface of the pipe 56 extending through the pipe receiving opening or bore 54 in seal 50. In addition, it is clear that the effect of seal 40 is to prevent leakage of gas between the external surface of the wall 28 of the cup shaped closure 20 and the internal surface 48 of the connecter tube 10, see FIG. 3. In addition, the compressive forces acting between the surface 64 of the bore 54 in seal 50 and the outer surface of the pipe 56 prevents leakage between the seal and the pipe. With this arrangement it can be seen that when the pipe 56 is inserted in seal 50, both the seal 50 and seal 40 are isolated from high temperatures, moisture or corrosive gases or fluids in the region external to the connector 10.

As stated above, seal 50 is formed from a fiber glass impregnated silicone rubber. Consequently, long periods of use, at high temperature, gradually cause a thin layer 66 of compression set material to form around the external surface of pipe 56, see FIG. 3. This layer is hardened and would tend to cause leakage between the surface 64 of the pipe receiving bore 54 in seal 50 and the external surface of the pipe 56. However, there is a sufficient mass of resilient material behind the hardened layer 66 to cause a continuous biasing force F to be exerted against this hardening layer 66 so that as it hardens it conforms to the surface of the pipe and prevents leakage from occurring at this point. Furthermore, this hardened layer 66 of compression set material tends to transfer heat from the external surface of the pipe 56 and the surface 64 of bore 54 in the seal 50 to the base 24 of the cup shaped closure 20. With this arrangement the formation of the thin layer of compression set material further isolates the unhardened resilient material behind this compression set material and prevents the hardened layer from increasing in thickness to any substantial extent despite long periods of use.

In order for this condition to occur, seal 50 must be sufficiently massive so that the high temperature fluid flowing through the pipe 56 does not reach the entire interior of the seal 50. This condition preferably occurs when the length of the pipe receiving bore 54 in seal 50 is on the order of the difference between the external diameter of the seal 50 and the diameter of the bore 54 in seal 50. With the arrangement described so far, seal 50 can easily be removed from the connecter tube 10 by simply removing the cup shaped closure 20 for purposes of repair or replacement.

The seal 50 described so far works very satisfactorily for many environmental conditions of use. However, it is noted that the ease of removal and replacement of seal 50 and the ease of installation of the seals inside the cup shaped closure make possible other combinations of materials to satisfy widely different environmental conditions. For example, the seal 52 mounted in the cup shaped closure 22 at the opposite end of the connecter tube 10 is formed from a stack of washer shaped materials, see FIG. 2. The various washers forming the seal 52 can be composed of any desired combination of materials to satisfy extremely high or low temperature situations or any environmental conditions which would require the seal to be formed from certain specialized materials.

Figure 5:
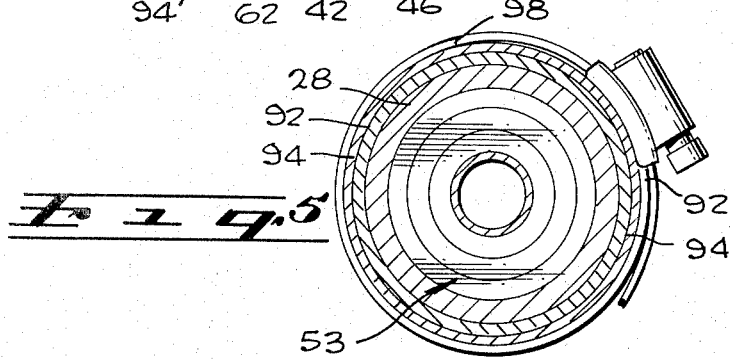
FIG. 5 is a sectional view taken on the line 5—5 of FIG. 4.
Figure 4:
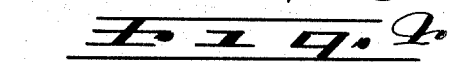
FIG. 4 is an elevational sectional view of the end of the portion of the connector shown in FIG. 2 with a modified seal.
Figure 6:
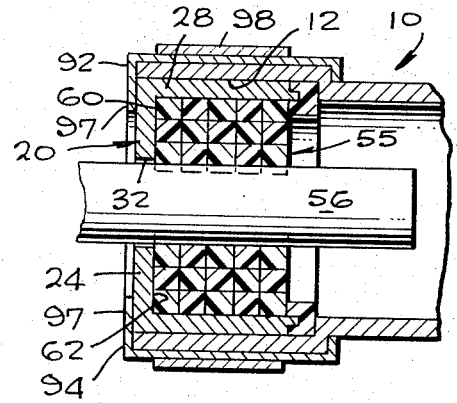
FIG. 6 is an elevational sectional view of the end of the portion of the connecter shown in FIG. 2 and showing another modified seal.

Instead of a stack of washers, the seal 53 shown in FIGS. 4 and 5 is formed from concentric and abutting layers of cylindrical materials. The seal 55, shown in FIG. 6, is formed from a stack of washers where each washer is formed from concentric rings of different materials. The seal 57, shown in FIG. 7, is formed from an array of abutting and concentric rings and cylinders formed from different materials.

Figure 7:
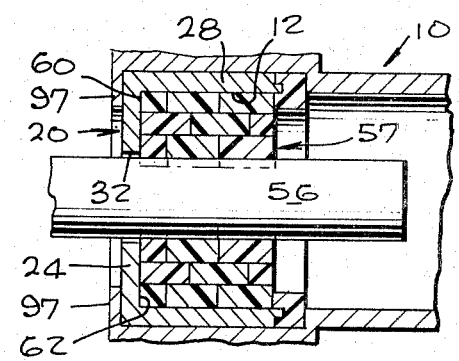
FIG. 7 is an elevational sectional view of the end portion of the connecter shown in FIG. 2 with still another modified seal.

It is also noted, as shown in FIGS. 6 and 7, that whereas each of the elements forming the seal 52 are formed from a single material, the individual elements themselves, as shown in FIGS. 6 and 7, could be formed from concentric rings of different materials arranged in a stack or an array of concentric tubes of different materials. With this arrangement, the seal could be constructed to withstand a very large range of environmental situations.

Figure 8:
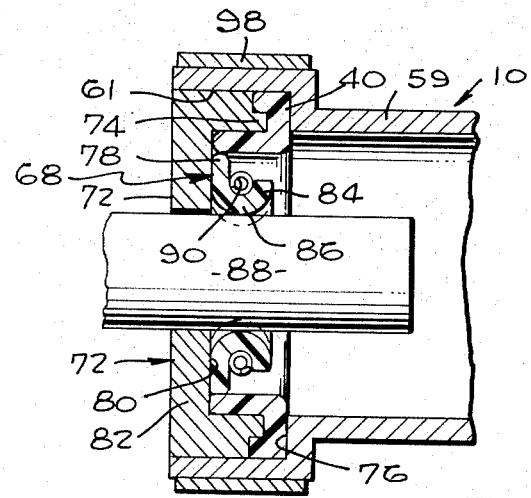
FIG. 8 is an elevational sectional view of the end of a connecter and showing a modified connecter seal.
Figure 9:
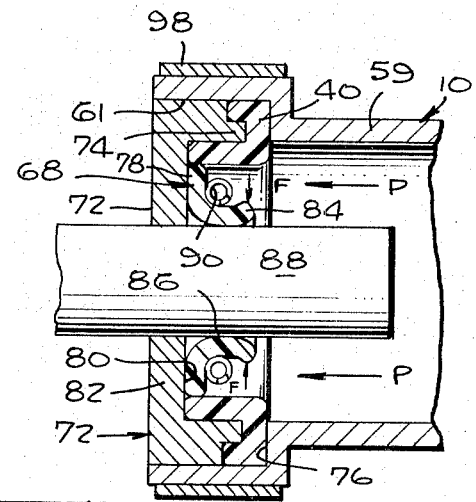
FIG. 9 is an elevational sectional view of the connecter and seal shown in FIG. 8 displaying the effects of pressure on the seal shown in FIG. 8.

The seal 50, shown in FIG. 2, operates satisfactorily for a very long period of time. However, the massiveness of the seal could cause a weight problem in situations where large numbers of these connecters are required, as in high speed aircraft. If the weight of the seal because of the number required is objectionable, the pressure responsive seal 68, shown in FIG. 8, may be used. If seal 68 is used, the connecter tube 59 would be modified so counter bore 61 is smaller in depth in comparison to connector 10, shown in FIG. 2. Correspondingly, a cup shaped closure 72, which closes off the end of the connecter 59, would be provided with walls 74 which have a smaller length, as shown in FIGS. 8 and 9. It is noted, however, that the free end of the wall 74 is reduced and the seal 40', generally similar to the seal 40 used in connection with seal 50 shown in FIG. 2, is here used in connection with seal 68 as shown in FIG. 8. When installed, the end 44 of the seal 40' opposite the groove 42 bears against a shoulder 76 and the connector 59.

Figure 10:
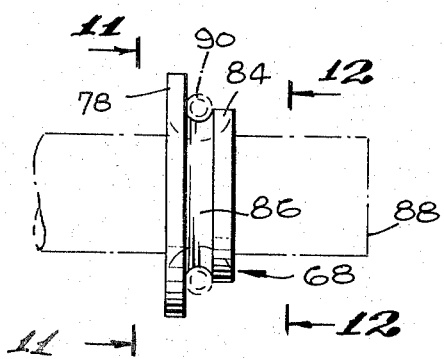
FIG. 10 is an elevational view of the seal used with the connecter shown in FIG. 8 as mounted on a pipe.
Figure 11:
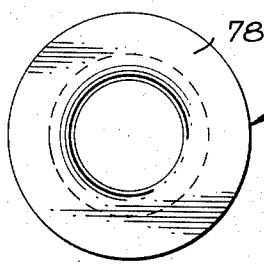
FIG. 11 is a sectional view taken on the line 11—11 of FIG. 10.
Figure 12:
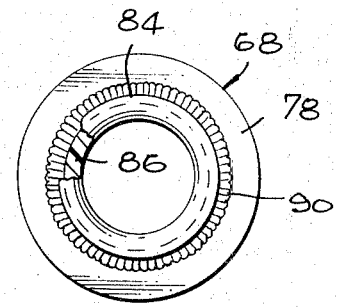
FIG. 12 is a sectional view taken on the line 12—12 of FIG. 10.

As shown, seal 68 is an annular ring shaped element and is generally channel shaped in cross section, see FIGS. 8, 9 and 10. The seal is designed so that one leg 78 of the seal bears against or is bonded to the inner surface 80 of base 82 of the cup shaped closure 72. The seal 68 is provided with a second leg 84 disposed in inwardly spaced relation to leg 78, as shown in FIGS. 8, 9 and 10. The legs 78 and 84 are connected by a webbed portion 86, which defines a pipe receiving opening extending through seal 68, as shown in FIGS. 8, 9, 10, 11 and 12. When the seal 68 is mounted in the cup shaped closure 72, the web 86 bears against the outer surface of a pipe 88. When the interior of the connector 59 is pressurized, as during use, the pressure acting on seal 68 causes a deformation of the seal and bends leg 84 down against the outer surface of the pipe 88 to provide sealing engagement between the seal 68 and the outer surface of the pipe 88, see FIG. 9.

Seal 68 is formed from a silicone rubber like material, and long continued use under high temperatures causes the thin layer of the silicone rubber bearing against the hot pipe 88 to harden in what is called a compression set layer. This hardening would tend to produce leakage between the outer surface of the pipe 88 and the web portion 86. To prevent this from happening a garter spring 90 is mounted on the seal 68, as shown, and the garter spring is sized to exert a continuous compressive force between the web portion 86 of the seal 68 and the outer surface of the pipe 88. With this arrangement, as the layer of compressioned set material gradually forms, the action of spring 90 is to continuously bias and shape the compression set layer so it adheres closely to the outer surface of the pipe and does not leak. The effect of the garter spring is generally the same as the compressive effect of the resilient material in seal 50 which is behind the layer of compression set material, shown in FIG. 3.

Referring again to FIG. 2 of the drawings, it is noted that seal 50 at one end of the connector tube 10 is formed from an integral massive piece of silicone rubber, while the seal 52 at the opposite end is formed from a stack of washers of different materials. Such an arrangement might occur where the connector tube is long and where the temperature at one end of the connecter tube is much higher than the temperature at the other end of the connecter tube, necessitating seals formed from different materials. It is, of course, contemplated that the teachings of this invention could be practiced in a connecter tube using the same materials at both ends of the tube and it can be practiced with connecter tubes having only one seal, as described below.

The cup shaped closures 20, 22 or 72 mounted in the ends of the connecter tube 10 must be held locked in position against the pressures inside the connecter tube. This can be done in a variety of ways. In this particular embodiment, however, the cup shaped closures and seals are held inside the connecter tube 10 through the use of two semi-cylindrical pieces 92 and 94, see FIG. 1. These semi-cylindrical pieces are generally channel shaped in cross section and one wall 95 of the channel fits over the external shoulder 96 of the ends of the connector housing while the other wall 97 of the channel fits over the ends of the connector tube and covers a small portion of the base of the cup shaped closure, see FIG. 4. These semi-cylindrical pieces are held in place through the use of a cylindrical band 98 which can be tightened around them to prevent them from falling off the end of the tube. With this arrangement the cup shaped closures are locked inside the connecter 10.

Under some circumstances, as where the connecters are located in a place where it would be very difficult to remove the seals if leakage should occur, it would be useful to be able to control and vary the compressive force exerted by the seals in the cup shaped closure on the external surface of the pipe extending through the pipe receiving openings in the cup shaped closure and seal. If the ends of the connecter 100 were weakened by being reduced in thickness or by the use of appropriate score lines 102 or by other means, and if the walls 101 of the cup shaped closure 103 were also weakened by similar means, then if a compressive force could be exerted on the outer surface of the connecter tube 100, this compressive force would be transmitted to the seal 50 to control and vary the compressive force exerted by the seal 50 on the outer surface of the pipes extending through the pipe receiving openings. This could prevent leakage. As shown in FIGS. 13 and 14, this has been done by threading the external surface 104 of the ends of the connecter tube 100 and providing a suitably shaped tapered nut 106, which when threaded onto the external surface of the connector tube 10 acts to compress and deflect the ends of the connector tube 10, the walls of the cup shaped closure 103, and causes an increase in the compressive force exerted by the seal 50 on the external surface of the pipe 56 extending through the pipe receiving opening. With this arrangement, if leakage should somehow occur between the seal 50, for example, and the external surface of the pipe 56, then by simply tightening the nut 106 the compressive force exerted between the seal 56 and the outer surface of the pipe 56 would be increased and the leakage would be stopped. It is noted that nut 106 is counter bored at 108 and is internally threaded. The base 109 of nut 106 bears against the base 107 of the cup shaped closure 103 and holds the seal 50 and the cup shaped closure 103 in position against pressures inside the connecter tube 100.

In the modification shown in FIGS. 15 and 16, the connecter 110 is counterbored at 112 defining a seal receiving shoulder 114. The counterbored portion of connector 110 is slotted at 115, 116, 118 and 120, defining quarter segments 122, 124, 126 and 128 respectively. In this embodiment, a tapered nut 130 serves both as a container for seal 132 and as a means for varying the compressive force between seal 132 and connecter 110. The seal 132 like seal 50 is mounted in the cup shaped nut with the corners 134 of the seal bearing against shoulder 114 in sealing engagement therewith, see FIG. 16.

The nut 130 is provided with a base 136 and the end of seal 132 bears against the inner surface of base 136. The external surface of the slotted counterbored portion of the connecter 110 is threaded and is in threaded engagement with the inner surface of nut 130, see FIG. 15. With this arrangement, if leakage should occur between the corners 134 and the shoulder 114 of connecter 110 it may be stopped by simply tightening the nut 130.

Although, as shown in FIGS. 14 and 15, the compressive force is varied by tigtening a nut on the other surface of the ends of the tube, it is apparent and it is contemplated that other means could be used for varying this compressive force for stopping leaks, and such use is contemplated.

To this point, the connecter 10 has been shown connecting two pipes together. It is, of course, apparent that the principles of this invention could be practiced with different types of connecters. For example, as shown in FIG. 18, a bulkhead 140 is provided with a gas outlet opening 142. The pipe connector 144 is bolted over opening 140, as shown in FIG. 18. This pipe connector is cylindrical and is provided with a counterbore 146 at one end, the counterbore defines the shoulder 148. A cup shaped closure 150 is designed to fit in the free end of the connecter 144 as shown in FIG. 18. The cup shaped closure 150 carries a seal 152 which operates the same way as the seal 50, shown in FIG. 2. A pipe 154 extends through aligned openings in the cup shaped closure 150 and the seal, and the seal 152 is designed so that the penetration of the pipe 154 in the cup shaped closure 150 and seal 152 isolates the seal from possible corrosion in the atmosphere external to the connecter.

To vary the compressive force exerted by seal 152, and prevent leakage, the outer surface of the end of connector 144 is threaded at 156. The threaded portion is engaged by the tapered nut 158, as shown in FIG. 17. If the end of the connecter 144 and the walls of the cup shaped closure 150 are weakened, then tightening the tapered nut 158 increases the compressive force exerted by the seal 152 on pipe 154 and stops leakage.

Having shown and described the invention, what I claim as new is:

1. A connector for pipes comprising a generally cylindrical tube, said tube having at least one open end portion, a cup shaped closure for closing off the open end of said cylindrical tube, said cup shaped closure removably mounted in the open end of said tube with the walls of said cup shaped closure abutting the walls of the end of said tube, a seal mounted in said cup shaped closure, said cup shaped closure with said seal mounted therein having aligned pipe receiving openings extending therein, whereby when said cup shaped closure is mounted in the open end of said tube with the pipe to be connected extending through said pipe receiving opening in sealing engagement with the pipe receiving opening in said seal, said seal is substantially isolated from corrosive fluids, moisture, and damaging temperatures outside the connector, and adjustable pressure resisting means for retaining said cup shaped closure in the end of the cylindrical tube against a pre-determined internal pressure, said cylindrical tube is reduced in diameter adjacent at least one end, defining thereby an external shoulder intermediate the ends of the tube, said adjustable pressure resisting means including retaining means, said retaining means generally channel shaped in cross section and including spaced walls and an intermediate web portion, the sides and the spacing of said walls being such that when one wall fits over the end of the cup shaped closure in the tube, the other wall fits over and abuts the external shoulder of the cylindrical tube, said retaining means mounted on the end of the cylindrical tube to form a generally cylindrical segment embracing the end and external shoulder of the tube, said retaining means having adjustment means thereon for adjustably tightening the retaining means around the end of the cylindrical tube whereby the cup shaped closure is adjustably locked inside said cylindrical tube against said pre-determined internal pressure.

2. A connector for pipes comprising a generally cylindrical tube, said tube having at least one open end portion, the open end of said tube counterbored to provide a seal engaging shoulder near the end of said tube, a cup shaped closure for closing off the open end of said cylindrical tube, said cup shaped closure removably mounted in the open end of said tube, the walls of the cup shaped closure abutting the surface of the ends of the tube, a first pressure responsive seal mounted in said cup shaped closure, said cup shaped closure and said first seal having aligned pipe receiving openings extending therethrough, a second seal, said second seal dimensioned so when said cup shaped closure is mounted on the end of the tube, a portion of the second seal moves into sealing engagement with said shoulder, the pipe receiving opening in the first seal dimensioned so when a pipe extends through the said opening in the cup shaped closure in sealing engagement with the pipe receiving opening in the first pressure responsive seal, said second seal is isolated from corrosive fluids, moisture and damaging temperatures outside the connector, and adjustable pressure resisting means for retaining said cup shaped closure in the end of the tube against a pre-determined pressure inside the tube, said cylindrical tube is reduced in diameter adjacent at least one end defining thereby an external shoulder intermediate the ends of the tube, said adjustable pressure resisting means including retaining means, said retaining means generally channel shaped in cross section and including spaced walls and an intermediate web portion, the sides and the spacing of said walls being such that when one wall fits over the end of the cup shaped closure in the tube, the other wall fits over and abuts the external shoulder of the cylindrical tube, said retaining means mounted on the ends of the cylindrical tube to form a generally cylindrical segment embracing the end and external shoulder of the tube, said retaining means having adjustment means thereon for adjustably tightening the retaining means around the end of the cylindrical tube whereby the cup shaped closure is adjustably locked inside said cylindrical tube against said pre-determined internal pressure.

3. A connector for pipes comprising a generally cylindrical tube, said tube having at least one open end portion, the open end of said tube counterbored to provide a seal engaging shoulder near the end of said tube, a cup shaped closure for closing off the open end of said cylindrical tube, said cup shaped closure removably mounted in the open end of said tube with the walls of said cup shaped closure abutting the inner surface of the end of said tube, the free end of the walls of said cup shaped closure reduced in thickness and terminating near said seal engaging shoulder, a first annular seal having a shoulder engaging base portion, a wall engaging side portion and a groove, said first seal mounted so the reduced end of the walls of said cup shaped closure enters said groove with the base of said first seal in sealing engagement with said shoulder and the side of said seal in sealing engagement with the inner surface of said tube, a second pressure responsive seal mounted in said cup shaped closure, said cup shaped closure with said seal mounted therein having aligned pipe receiving openings extending therethrough whereby when said cup shaped closure is mounted in the ends of said tube with the pipe to be connected extending through said pipe receiving opening in sealing engagement with said second seal, said first and second seals are isolated from corrosive fluids, moisture and damaging temperatures outside the connector, and adjustable pressure resisting means for retaining said cup shaped closure in the end of the cylindrical tube against a pre-determined internal pressure.

4. The connector described in claim 3 wherein said cylindrical tube is reduced in diameter adjacent at least one end and defining thereby an external shoulder intermediate the tube, and two semi-cylindrical pieces, said pieces generally channel shaped in cross-section including spaced walls and an intermediate web portion, the sides and the spacing of said walls such that when one wall fits over the end of the cup shaped closure in the tube, the other wall fits over and abuts the external shoulder of the cylindrical tube, said semi-cylindrical pieces mounted on the ends of the cylindrical tube so they form a generally cylindrical segment embracing the end and external shoulder of the tube, and a strap embracing said semi-cylindrical pieces on the end of the cylindrical tube, means mounted on the strap for adjustably tightening the strap around the end of the cylindrical tube whereby the cup shaped closure is adjustably locked inside said tube cylindrical against said predetermined internal pressure.

5. The connector described in claim 4 wherein said second pressure responsive seal comprises an annular ring shaped element generally channel shaped in cross-section, said second pressure responsive seal mounted in said cup shaped closure so one leg of said seal bears against the base of said cup shaped closure member while the other leg is in inwardly spaced relation to said first leg and connected thereto by a web portion, said web portion defining an opening through said seal sized to snugly receive and engage a pipe extending through said cup shaped closure and said opening whereby when the interior of said connector is pressurized, the pressure deforms and bends said other leg down into sealing engagement with the outer surface of the pipe.

6. The connector described in claim 5 including a garter spring mounted in said annular ring shaped element bearing against the web portion of the second pressure responsive seal and exerting radially inwardly directed force on the web of said seal, whereby if the web portion of the seal hardens during prolonged use, the garter spring biases and shapes the hardened web portion so it remains in sealing engagement with the outer surface of the tube to prolong the life of the seal.

* * * * *